United States Patent [19]

Watkins et al.

[11] Patent Number: 5,209,906

[45] Date of Patent: May 11, 1993

[54] MODULAR ISOTHERMAL REACTOR

[75] Inventors: David S. Watkins, Coquitlam; Eric G. Pow; Donald A. Lines, both of Vancouver, all of Canada

[73] Assignee: Her Majesty the Queen as represented by the Minister of National Defence of Her Majesty's Canadian Government, Ottawa, Canada

[21] Appl. No.: 698,666

[22] Filed: May 10, 1991

[51] Int. Cl.⁵ ............................ F28D 7/00; F28D 3/12
[52] U.S. Cl. .................................... 422/200; 422/198; 422/201; 422/205; 165/163; 165/164; 165/168; 165/169
[58] Field of Search ................. 429/17, 19; 422/198, 422/200, 201, 202, 205, 211; 48/61; 165/163, 164, 168, 169

[56] References Cited

U.S. PATENT DOCUMENTS

| | | | |
|---|---|---|---|
| 1,691,903 | 11/1928 | Mortimer | 422/198 X |
| 2,127,561 | 8/1938 | Herrmann | 422/198 X |
| 4,430,304 | 2/1984 | Spurrier et al. | 422/204 |
| 4,504,447 | 3/1985 | Spurrier et al. | 422/204 |
| 4,540,045 | 9/1985 | Molitor | 165/164 |
| 4,619,317 | 10/1986 | Disselbeck et al. | 165/162 |
| 4,659,634 | 4/1987 | Struthers | 429/19 |
| 4,692,322 | 9/1987 | Moller et al. | 423/415 A |
| 4,729,931 | 3/1988 | Grimble | 429/17 |
| 4,737,161 | 4/1988 | Szydlowski et al. | 48/61 |
| 4,781,241 | 11/1988 | Misage et al. | 165/1 |
| 4,789,540 | 12/1988 | Jenkins | 423/648.1 |
| 4,812,373 | 3/1989 | Grimble et al. | 429/19 |
| 4,840,783 | 6/1989 | Quang et al. | 423/648.1 |
| 4,865,624 | 9/1989 | Okada | 48/61 |
| 4,877,693 | 10/1989 | Baker | 429/19 |
| 4,933,242 | 6/1990 | Koga et al. | 429/19 |
| 4,946,667 | 8/1990 | Beshty | 423/648.1 |

OTHER PUBLICATIONS

"Fuel Cell Sports Novel Reformer Design", *Chemical Engineering*, Feb. 1990, p. 19.
"The Off-the-Shelf Plate Heat Exchangers", Information Brochure from Alfa-Laval Thermal Co., Jun. 1989.

*Primary Examiner*—Robert J. Warden
*Assistant Examiner*—Christopher Y. Kim
*Attorney, Agent, or Firm*—McAndrews, Held & Malloy, Ltd.

[57] ABSTRACT

A compact modular isothermal reactor for converting a feedstock such as methanol into a fuel usable in power generation systems, such as electrochemical fuel cells, is provided. The reactor includes a sealing plate, a baffle plate having heat transfer surfaces extending toward the sealing plate, and a housing having an interior substantially circumscribing the heat transfer surfaces The cooperating surfaces of the sealing plate, baffle plate, heat transfer surfaces and housing interior define a labyrinthine channel for containing a suitable quantity of solid catalyst and through which feedstock flows. The cooperating surfaces of a fluid flow plate and the baffle plate define a flow passage for carrying a thermal fluid. Heat is transferred from the thermal fluid to the feedstock by the heat transfer surfaces. In two alternative designs, thermally conductive pins extending from the baffle plate or a pair of spaced folded thermally conductive plates transfer heat to the interior of a catalyst containment vessel. In an optional heat exchange section, the feedstock is preheated before being directed to the reactor.

21 Claims, 5 Drawing Sheets

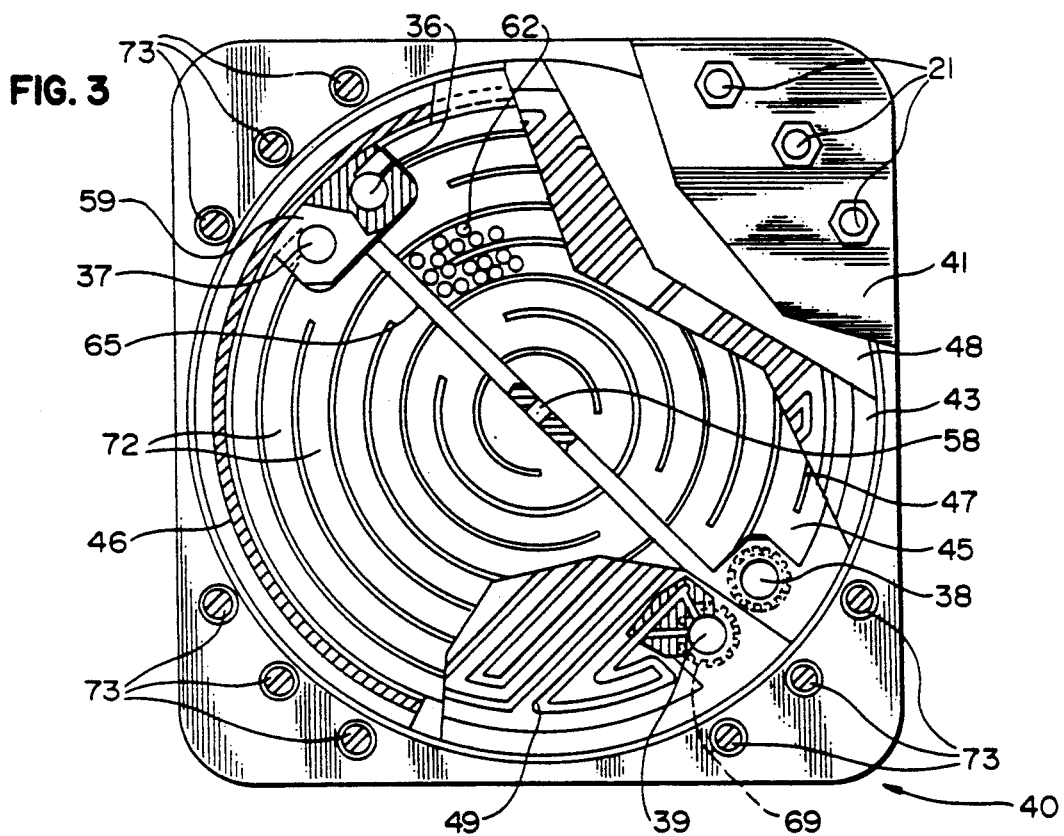
FIG. 3
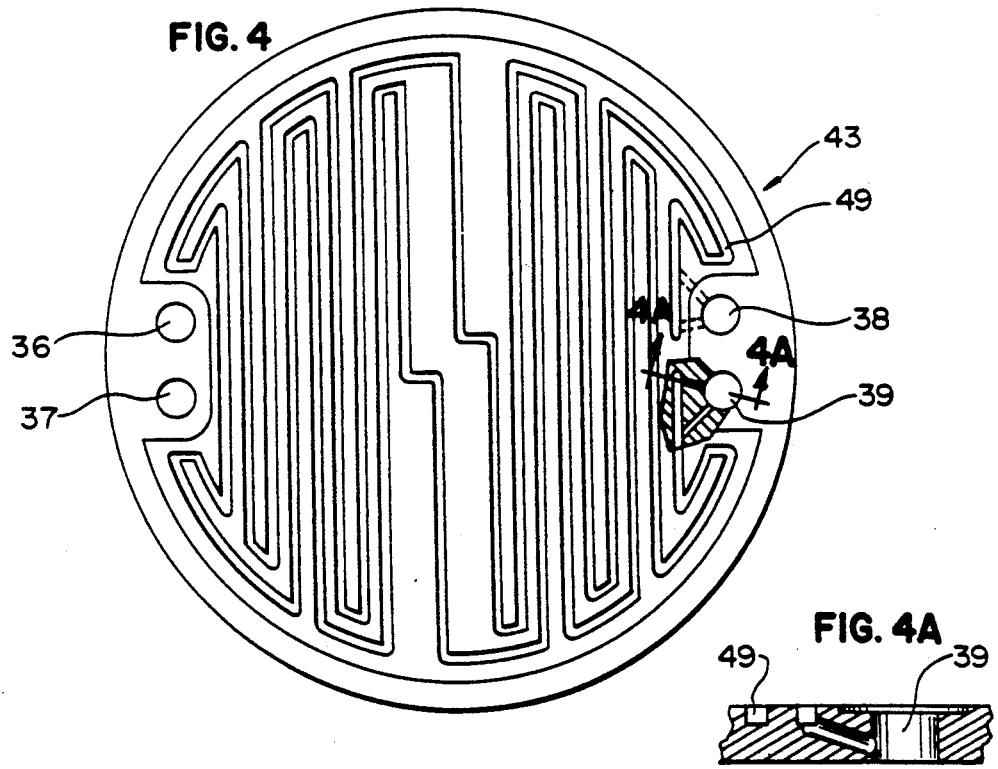
FIG. 4
FIG. 4A

MODULAR ISOTHERMAL REACTOR

FIELD OF THE INVENTION

The present invention relates to isothermal reactors useful in converting a feedstock into a fuel suitable for use in power generation systems. In particular, the present invention relates to an isothermal plug flow reactor having a plate-and-frame design and heat transfer surfaces which extend from one thermally conductive plate to the surface of an adjacent plate.

BACKGROUND OF THE INVENTION

In one typical application of the invention, the reactor serves as a reformer to convert reactants such as steam and methanol into a hydrogen-rich fuel usable in electrochemical fuel cells. The reaction process, referred to as reforming or steam reforming, may be represented by the following equation:

$$CH_3OH + H_2O + Heat \rightarrow 3H_2 + CO_2$$

Typical industrial reformers are large, fixed-site units designed for continuous operation at roughly constant throughput. The reactor vessel typically employs a conventional shell-and-tube design in which reactants pass through tubes containing catalyst while heat is applied, usually in the form of hot gases contained within the shell, to the outside of the tube.

Most efforts to date to produce small reformers for mobile applications and other applications requiring a compact design have used modifications of the industrial shell-and-tube concept. For example, U.S. Pat. No. 4,737,161 discloses a reformer for use in reforming a raw hydrocarbon feedstock into a hydrogen gas suitable for use in a mobile fuel cell power plant. The reformer comprises a cylindrical housing, a cylindrical flame tube within the housing, and a helical tube containing catalyst for promoting the reforming reaction. The helical tube is located in the annular space between the flame tube and the reformer housing. Hot gases supply the necessary heat of reaction. A disadvantage of this design is that, while it may result in a more compact reformer than conventional shell-and-tube reformers, it still cannot achieve the compactness of a plate-and-frame design reformer. Moreover, it does not exhibit the modularity of the present design. For example, the capacity of the present plate-and-frame design can be enlarged by simply adding more plate-and-frame units to the reactor stack.

Plate-and-frame type reformers are known in the prior art. For example, U.S. Pat. No. 4,933,242 discloses a power generation system which includes a fuel cell section comprising a cell stack including alternately interleaved fuel cell elements and separator plates. The power generation system also includes a plate-type reformer assembly with gas passages extending within the cell stack and the reformer assembly. A disadvantage of this design is that the reactants pass through the plates at a relatively lower linear velocity than that achieved in the present design. A lower linear velocity results in a thicker boundary layer along the reactor walls, which inhibits the efficient transfer of heat from the heated side of the plates to the reactor side.

The present invention offers a number of advantages over prior art structures. First, the plate-and-frame design coupled with the labyrinthine configuration of the reactant flow passage increases the transfer of heat from the thermal fluid to the reactants by providing a high ratio of heat transfer surface area to reactor volume and by increasing the linear velocity of the reactants through the reactor for a given space velocity. The high ratio of heat transfer surface area to catalyst bed volume provides more surface area for heat transfer to occur. The high linear velocity of the reactants through the reactant flow passage reduces the thickness of the boundary layer, which improves the transfer of heat from the walls of the reactant flow passage to the reactants. The use of extended heat transfer surfaces also increases the turbulence of the reactant gases, resulting in a higher conversion of feedstock to reformate fuel.

Second, the plate-and-frame design provides a more compact overall unit than the conventional shell-and-tube design. For example, the heat exchange section of the present invention requires only about one-fifth the volume and weight of a conventional shell-and-tube heat exchanger.

Third, the plate-and-frame design results in a high degree of modularity. In particular, if more reformer capacity is needed, additional plate and frame units may be connected in a stacked arrangement.

Finally, the use of a pumpable thermal fluid instead of combustion gas to provide heat to the reactor improves temperature control. Because of the high heat capacity of the thermal fluid, more heat can be provided to the reactor for a given period of time. Due to the high rate of heat transfer and the variable thermal mass inherent in the thermal fluid, start-up times are faster. Also, the use of a thermal fluid provides favorable load following characteristics because of the high heat capacity of the thermal fluid. The use of a pumpable thermal fluid which is heated in an external reservoir creates a significant thermal capacitance in the reservoir which allows for changes in heat delivery required by changes in fuel cell load.

OBJECTS OF THE INVENTION

It is, therefore, an object of the present invention to provide a small, compact isothermal fixed bed reactor by employing a plate-and-frame design and heat transfer surfaces extending from the surface of one thermally conductive plate to the surface of an adjacent plate, forming a labyrinthine catalyst bed through which reactants flow.

It is a further object of the present invention to provide a reactor that is modular in design to permit ready scaling to larger capacity units.

A further object of the present invention is to provide a reactor capable of providing reformate fuel for electrochemical fuel cells.

Still another object of the present invention is to provide a reactor having a reaction section and a heat exchange section of similar plate-and-frame construction such that the reactor section and heat exchange section can be consolidated into a single unitary assembly.

Further and additional objects will appear from the description, accompanying drawings, and appended claims.

SUMMARY OF THE INVENTION

According to the invention, a modular isothermal reactor useful in converting a feedstock into a fuel useable in power generation systems is provided. In the preferred embodiment, the modular reactor has a reaction section and a heat exchange section, both based on a similar plate-and-frame design.

In one embodiment, the reactor comprises a sealing plate, a baffle plate adjacent the sealing plate, a housing interposed between the sealing plate and the baffle plate, and a fluid flow plate adjacent the baffle plate. The cooperating surfaces of the fluid flow plate and the baffle plate define a flow passage for carrying a thermal fluid. Heat transfer structures extend from the surface of the baffle plate in the direction of the sealing plate. The interior surface of the housing substantially circumscribes the heat transfer surfaces so that the cooperating surfaces of the sealing plate, baffle plate, heat transfer structures and housing define a labyrinthine channel for containing catalyst and accommodating the flow of feedstock. By providing a relatively long and narrow reactant path with minimal cross-sectional area, the present design increases the linear velocity of the reactants for a given space velocity. As a result, the boundary layer thickness along the reactant path walls is reduced, thereby improving the transfer of heat from the walls to the reactants which improves the conversion of reactants to reaction products.

In the preferred embodiment, the labyrinthine channel has a feedstock inlet port and a fuel outlet port located near the interior surface of the housing. The labyrinthine channel between the sealing plate and the baffle plate comprises a plurality of semicircular arcuate channels arranged substantially symmetrically.

Preferably, the flow passage for the thermal fluid comprises a plurality of substantially parallel segments, such that a fluid passing through the passage flows alternately in one direction and then in a substantially opposite direction.

The reactor preferably comprises a second fluid flow plate interposed between the sealing plate and housing so that, in the assembled reactor, the cooperating surfaces of the second fluid flow plate and the sealing plate form a passage for carrying a thermal fluid.

Preferably, there is an end plate at each end of the reactor stack. The end plates can be formed as flat, planar elements, but are preferably flanged and dished to permit the use of thinner walled material. These end plates preferably have ports through which tie rods may be inserted. The tie rods extend from one end plate to the other and may be secured by bolts, thus consolidating the reactor stack into a single unitary assembly.

Where the reactants are steam and methanol to be converted into a hydrogen-rich fuel suitable for use in electrochemical fuel cells, the catalyst contained within the catalyst bed chamber preferably is a copper—zinc oxide catalyst.

The end plates and housing preferably are formed of stainless steel. The sealing plate, fluid flow plates, baffle plate, and heat transfer structures preferably are formed of copper, but can also be formed of aluminum.

In a second embodiment of the reactor, the heat transfer surfaces are thermally conductive pins extending from one surface of the baffle plate into the catalyst bed chamber.

In a third embodiment, the reactor comprises a first sealing plate, a second sealing plate, a housing interposed between the sealing plates, a catalyst containment vessel, and at least one pair of folded plates extending inside the catalyst containment vessel. The catalyst containment vessel sits inside the housing and contains catalyst for promoting the reforming reaction The folded plates are spaced apart so that a thermal fluid may pass therebetween. The folded plates preferably are folded into an accordian-like configuration so that, when the folded plates are placed within the catalyst bed chamber, the folded plates form "A" shaped channels in the catalyst bed chamber through which a feedstock is passed.

In the preferred embodiment, the reactor has a reaction section as described above and a heat exchange section. The heat exchange section comprises a plurality of plates of a thermally conductive material into which are formed a plurality of channels through which either a thermal fluid or a feedstock to be pre-heated is passed. The feedstock to be pre-heated typically is either methanol, water, or a mixture thereof. The number of plates in the heat exchange section may be varied depending upon the heating requirements.

BRIEF DESCRIPTION OF THE DRAWINGS

For a more complete understanding of the invention reference is made to the drawings, wherein:

FIG. 3 is a top view of a reaction section of a modular isothermal reactor, showing the labyrinthine passage which contains the reaction catalyst and in which the reaction takes place, and the fluid flow channel through which the thermal fluid flows FIG. 4 is a top view of a fluid flow plate with channels formed therein for carrying thermal fluid.

FIG. 4A is a side sectional view of a thermal fluid port taken in the direction of arrows 4A—4A in FIG. 4.

DETAILED DESCRIPTION OF THE DRAWINGS

Figure 1:
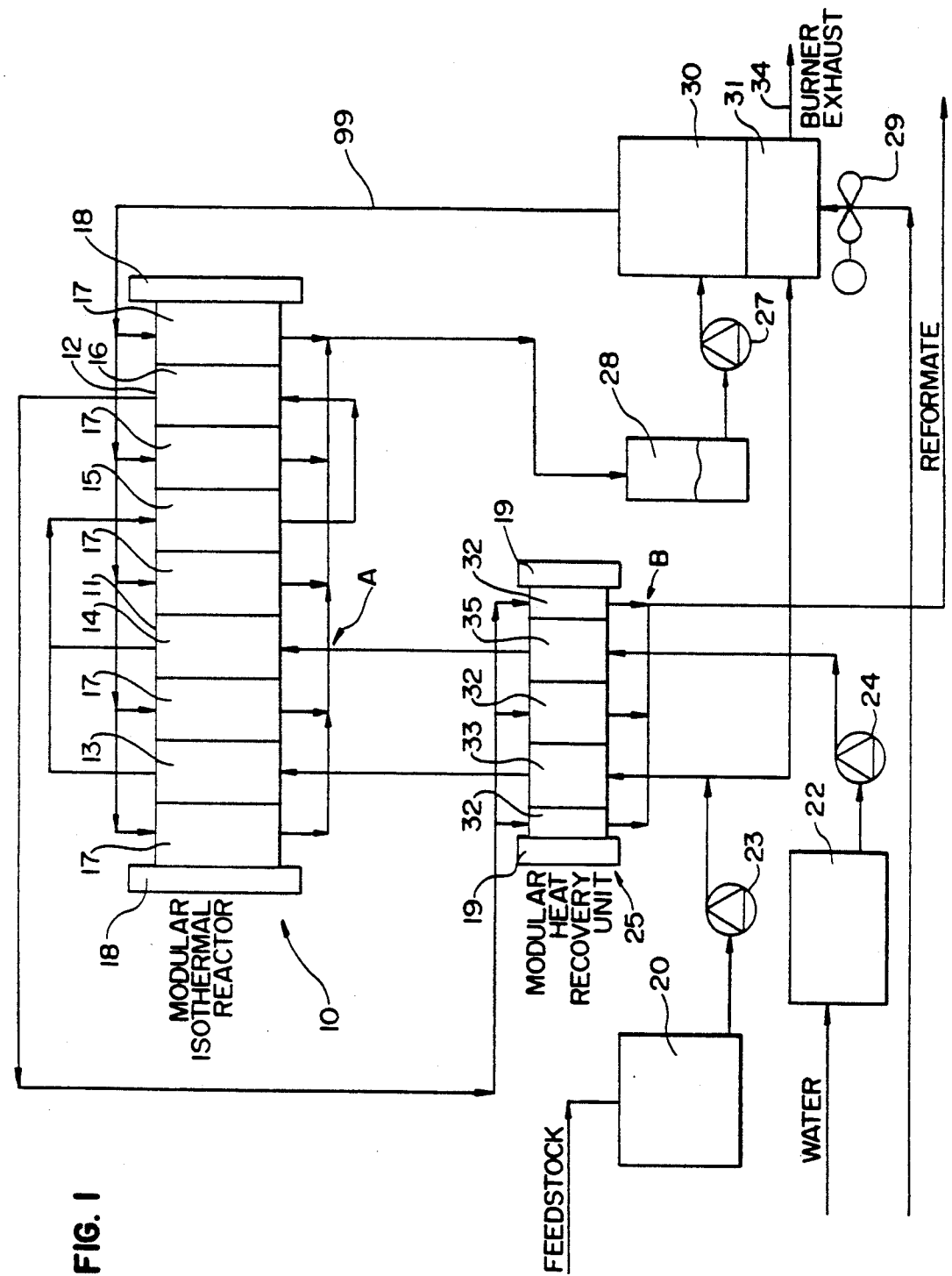
FIG. 1 is a schematic diagram of the modular isothermal reactor of the present invention, also showing a modular heat recovery unit, a feedstock storage unit, a water storage unit, and a thermal fluid storage/heating unit.

Referring now to FIG. 1 of the drawings, a modular isothermal reactor 10 is illustrated schematically, along with a feedstock storage unit 20, a water storage unit 22, a modular heat recovery unit 25, a thermal fluid reservoir 28, a heater 30, and a feedstock burner 31. The units are interconnected by conduit lines as shown, of which conduit line 99 is a typical example. Where the conduit lines appear to be crossing (e.g. point A) there is no communication between conduits, and thus no mixing of streams Where one conduit line terminates at a point along another conduit line (e.g. point B), the two conduits are in communication and there is a mixing of streams.

The modular isothermal reactor 10 is based on a plate-and-frame design and comprises a heat exchange section 11 and a reaction section 12 interposed between end plates 18. The heat exchange section 11 comprises a plurality of thermal fluid flow channels 17, at least one feedstock vaporizer channel 13, at least one water vaporizer channel 14, and at least one trim vaporizer and superheater 15. The reaction section 12 comprises a plurality of thermal fluid channels 17 and at least one reaction chamber 16.

In the embodiment illustrated in FIG. 1, the heat exchange section 11 comprises four thermal fluid flow channels 17, one feedstock vaporizer channel 13, one water vaporizer channel 14, and one trim vaporizer and superheater 15. The reaction section 12 comprises one thermal fluid flow channel 17 and one reaction chamber 16. However, as already noted, the actual number of thermal fluid flow channels, feedstock vaporizer channels, water vaporizer channels, trim vaporizer and superheaters, and reaction chambers may vary and still remain within the scope of the invention. Each channel is at least partly defined by the cooperating surfaces of adjacent plates, as will be explained in greater detail below.

In the case of a reforming reaction, the system begins with reformer feedstock, such as methanol, stored in feedstock storage unit 20 and water stored in water storage unit 22 being pumped via pumps 23 and 24 respectively to the modular heat recovery unit 25. The modular heat recovery unit 25 comprises a plurality of reformate passages 32, at least one feedstock passage 33 and at least one water passage 35 interposed between end plates 19. In the modular heat recovery unit 25, the reformer feedstock and water are pre-heated by the hot reformer product ("reformate") exiting from the reaction chamber 16 of the modular isothermal reactor 10. The preheated feedstock exiting feedstock passage 33 of the modular heat recovery unit 25 is directed to the feedstock vaporizer channel 13 in the modular isothermal reactor 10, where it is heated and vaporized by thermal fluid passing through thermal fluid flow channels 17. The preheated water exiting water passage 35 of the modular heat recovery unit 25 is directed to the water vaporizer channel 14 of the modular isothermal reactor 10, where it is also heated and vaporized by thermal fluid passing through thermal fluid flow channels 17.

The heated or thermal fluid originates in reservoir 28. The thermal fluid is pumped from reservoir 28 via pump 27 to thermal fluid heater 30 where it is heated by feedstock burned in feedstock burner 31. Fan 29 supplies air to feedstock burner 31, and burner exhaust exits through exhaust conduit 34. The thermal fluid circulates from the reservoir 28 through heater 30 to thermal fluid flow channels 17 of the modular isothermal reactor 10 and back to the reservoir 28. The thermal fluid circulation rate may be adjusted to changing heat load demand via pump 27. The reservoir 28 provides a capacitance of controlled temperature heat to follow the heat load demands of the reactor.

After being vaporized in the feedstock vaporizer channel 13 and the water vaporizer channel 14, the feedstock and water are mixed in a ratio of about one mole in the case of methanol feedstock to two moles of water, and then fed to the trim vaporizer and superheater 15 of the modular isothermal reactor 10. Here any condensate resulting from the mixing is superheated to about the optimum reforming temperature, expected to be about 225° C. Heat for this stage of the process is supplied by thermal fluid circulating on either side of the trim vaporizer and superheater 15 through thermal fluid flow channels 17.

The superheated feedstock/water mixture is then fed to the reaction section 12 of the modular isothermal reactor 10 where the endothermic reforming reaction is promoted with the use of a suitable catalyst. For reforming of a methanol feedstock mixed with steam, a copper - zinc oxide catalyst is preferred.

The endothermic heat of reaction is provided by thermal fluid circulating on either side of the reaction chamber 16 through thermal fluid flow channels 17. The outgoing reformate passes to the modular heat recovery unit 25 where it exchanges heat with incoming feedstock and water in order to cool the reformate to a temperature suitable for feeding to a fuel cell, typically less than 100° C.

Figure 2:
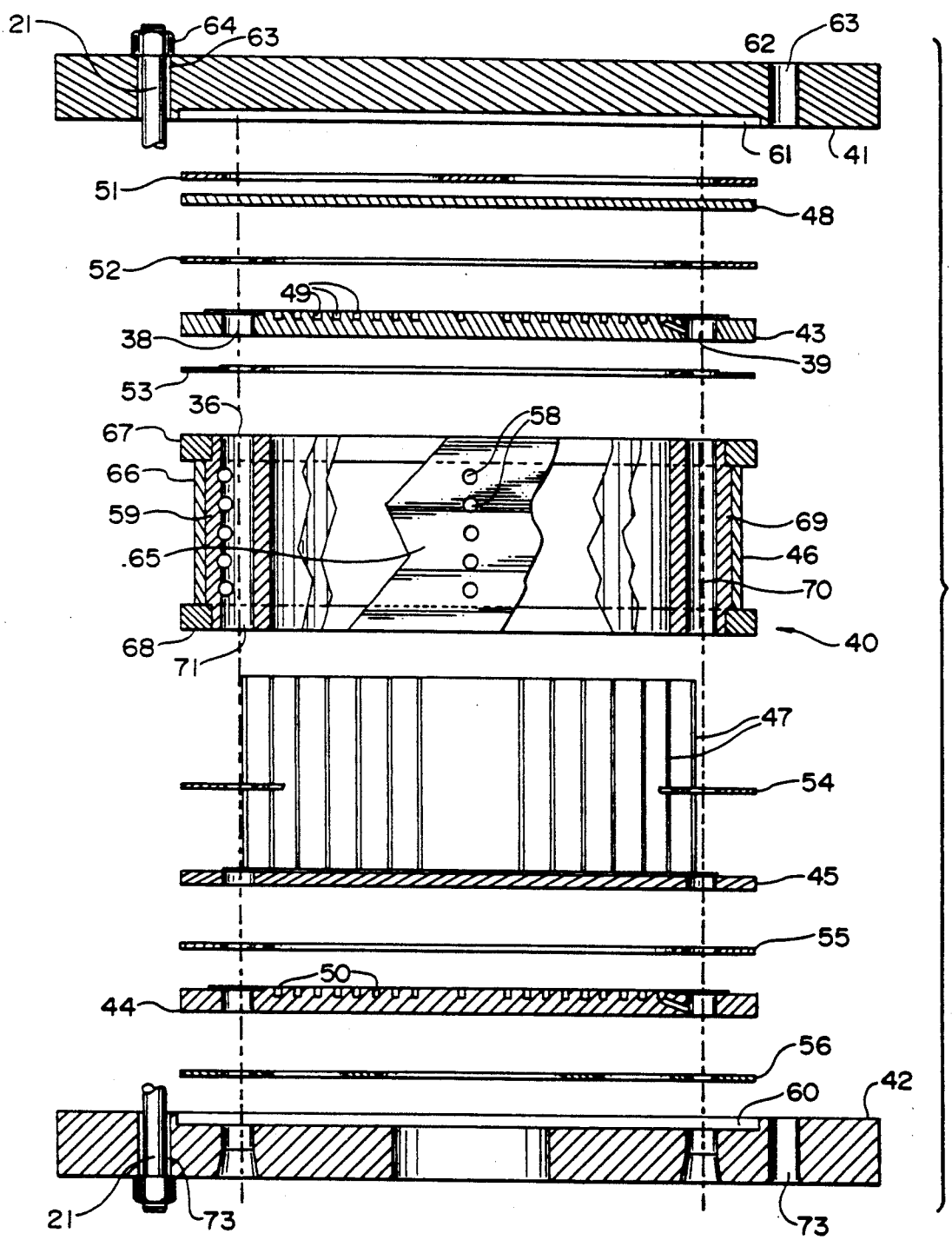
FIG. 2 is an exploded side view of a reaction section of a modular isothermal reactor.

FIG. 2 is an exploded side view of the reaction section of a modular isothermal reactor, designated generally as 40. Reaction section 40, sometimes referred to as reformer assembly 40, comprises a blind end plate 41, a sealing plate 48, a first fluid flow plate 43, a housing 46, a baffle plate 45, a second fluid flow plate 44, and a ported end plate 42. The sealing plate 48 is adjacent to the blind end plate 41. The first fluid flow plate 43, also called a fluid channel plate, is adjacent the sealing plate 48 so that the adjacent surfaces define a fluid flow channel 49 through which thermal fluid may be circulated. The baffle plate 45 is interposed between the first fluid flow plate, also referred to as a fluid channel plate 43 and the second fluid channel plate 44. Heat transfer structures 47 extend substantially perpendicularly from the surface of baffle plate 45 in a direction toward the first fluid channel plate 43.

The housing 46, also called a reformer cell housing, is interposed between the baffle plate 45 and the first fluid channel plate 43. The interior surface of the housing 46, the oppositely-facing, parallel horizontal surfaces of the baffle plate 45 and the first fluid channel plate 43 define a catalyst bed chamber which contains catalyst 62 (shown in FIG. 3) for promoting the reforming reaction and through which the reformer feedstock/water mixture is passed.

In the embodiment shown in FIG. 2, housing 46 comprises a cylindrical ring 66 with integrated diametrically opposed port blocks 59 and 69, and top and bottom flanges 67 and 68. Port block 59 contains two drilled out spaces, only one of which is shown in FIG. 2, designated by the number 71. Port block 69 also contains two drilled out spaces, only one of which is shown in FIG. 2, designated by the number 70. A bulkhead seal plate 65 extends from port block 59 to port block 69. Seal plate 65 has a plurality of holes 58 located substantially equidistant from port blocks 59 and 69.

The second fluid channel plate 44 is adjacent to the baffle plate 45 and interposed between the baffle plate 45 and the ported end plate 42. The adjacent surfaces of the second fluid channel plate 44 and the baffle plate 45 define a fluid channel 50 through which a thermal fluid is circulated.

Gaskets are interposed at various locations within the reformer assembly 40 to provide seals between the plates. As shown in FIG. 2, gasket 51 is interposed between blind end plate 41 and sealing plate 48. Gasket 52 is interposed between sealing plate 48 and first fluid channel plate 43. Gasket 53 is interposed between first fluid channel plate 43 and housing 46. Gasket 54 is interposed between housing 46 and baffle plate 45. Gasket 55 is interposed between baffle plate 45 and second fluid channel plate 44, and gasket 56 is interposed between second fluid channel plate 44 and ported end plate 42.

Blind end plate 41 has a recessed portion 61 for accommodating sealing plate 48. Likewise, ported end plate 42 has a recessed portion 60 for accommodating second fluid channel plate 44. Tie rods 21, only one of which is illustrated in FIG. 2, when inserted through ports 63 in the blind end plate 41 and ports 73 in the ported end plate 42, compress the reformer components into an integrated reformer assembly.

The end plates 41 and 42 preferably are flanged and dished to permit the use of thinner wall material, but they can also be flat as shown in FIG. 2.

The preferred material for the end plates 41 and 42 and the housing 46 is stainless steel. Other materials such as graphite or ceramics such as silicon nitride may be used. The sealing plate 48, the fluid flow plates 43 and 44, and the baffle plate 45 preferably are formed of copper, but aluminum could also be employed. The heat transfer structures 47 may be constructed of materials chosen from the following table, but copper is preferred.

| Materials For Heat Transfer Surfaces | | |
|---|---|---|
| Material | Heat Transfer Coefficient (k) (BTU/Hr-Ft$^2$-°F./Ft) | Specific Gravity |
| Copper | 225 | 8.9 |
| Graphite | 85 | 1.8 |
| Stainless Steel | 7.5 | 7.8 |
| Silicon Nitride | 35 | 3.2 |
| Aluminum | 95 | 2.8 |

The material for the gaskets 51, 52, 53, 54, 55, and 56 may be selected from the following, according to the specific properties required: silicone rubber, asbestos, graphite, carbon fiber, or filled serrated/corrugated metal. The tie rods 21 preferably are stainless steel.

FIG. 3 is a top view of the reaction section 40 of a modular isothermal reactor, providing a partial view of blind end plate 41, sealing plate 48, first fluid channel plate 43, and baffle plate 45. As shown in FIG. 3, heat transfer structures 47 form a labyrinthine passage 72 within the catalyst bed chamber. The catalyst bed chamber is packed with catalyst pellets 62, only a representative sample of which are shown in FIG. 3.

As already noted, heat transfer structures 47 extend from the surface of the baffle plate 45 into the catalyst bed. The heat transfer structures 47 provide surface area, in addition to the surface area of the baffle plate 45, for the transfer of heat from the thermal fluid circulating on one side of the baffle plate 45 into the catalyst bed. Heat transfer structures 47, baffle plate 45, first fluid channel plate 43, and housing 46 define a labyrinthine passage 72 having a semicircular configuration. By providing a relatively long and narrow reactant path with minimal cross-sectional area, the semicircular configuration increases the linear velocity of the reactants for a given space velocity. As a result, the boundary-layer thickness along the reactant path walls is reduced, thereby improving heat transfer and, ultimately, conversion of reactants to product.

Linear velocity refers to the velocity of a given "plug" of fluid through the reactor, and may be expressed in terms of ft/hr. Space velocity (S) represents the number of reactant "plug" changes within a given volume over a given period of time, and may be calculated as:

$$S = (\text{Flow rate of reactants, ft}^3/\text{hr})/(\text{Reactor volume, ft}^3)$$

The units of space velocity are inverse time, e.g., hr$^{-1}$.

The reactor of the present invention is a plug flow type reactor. Ideally, in a plug flow reactor there is complete mixing of fluids in the radial direction and no diffusion in the flow direction (i.e., no back mixing). The reactor of the present invention is also designed to operate under constant temperature, or isothermal, conditions.

FIG. 3 also shows three of the twelve tie rods 21 used to compress the reactor components into an integrated assembly. Tie rod ports 63 in the blind end plate 41 and tie rod ports 73 in the ported end plate 42 accommodate the tie rods 21.

During operation, the feedstock/water mixture enters inlet port 36 and flows through labyrinthine passage 72 where the catalyzed reaction occurs. The reaction products (reformate) exit outlet port 37. Heat for the reaction is supplied by a thermal fluid which circulates through channels on either side of the catalyst bed chamber. FIG. 3 shows one such channel, designated as 49. The thermal fluid enters through inlet port 38, flows through fluid flow channel 49, and exits through outlet port 39.

In this configuration, the inlet ports 36, 38 and outlet ports 37, 39 are located near the periphery of the baffle plate 45, near the tie rods 21. Locating the inlet and outlet ports near the tie rods instead of near the center of the plates insures a better seal around the inlet and outlet ports, preventing unwanted leakages.

FIG. 4 is a top view of first fluid channel plate 43, showing fluid flow channel 49 formed therein. In this particular embodiment, fluid flow channel 49 comprises a series of straight, parallel segments arranged in a generally symmetrical pattern in the first fluid channel plate 43. During operation, thermal fluid enters the fluid flow channel 49 at inlet port 38 and exits at fluid outlet port 39. FIG. 4A shows how fluid flow channel 49 and outlet port 39 are interconnected.

Figure 5:
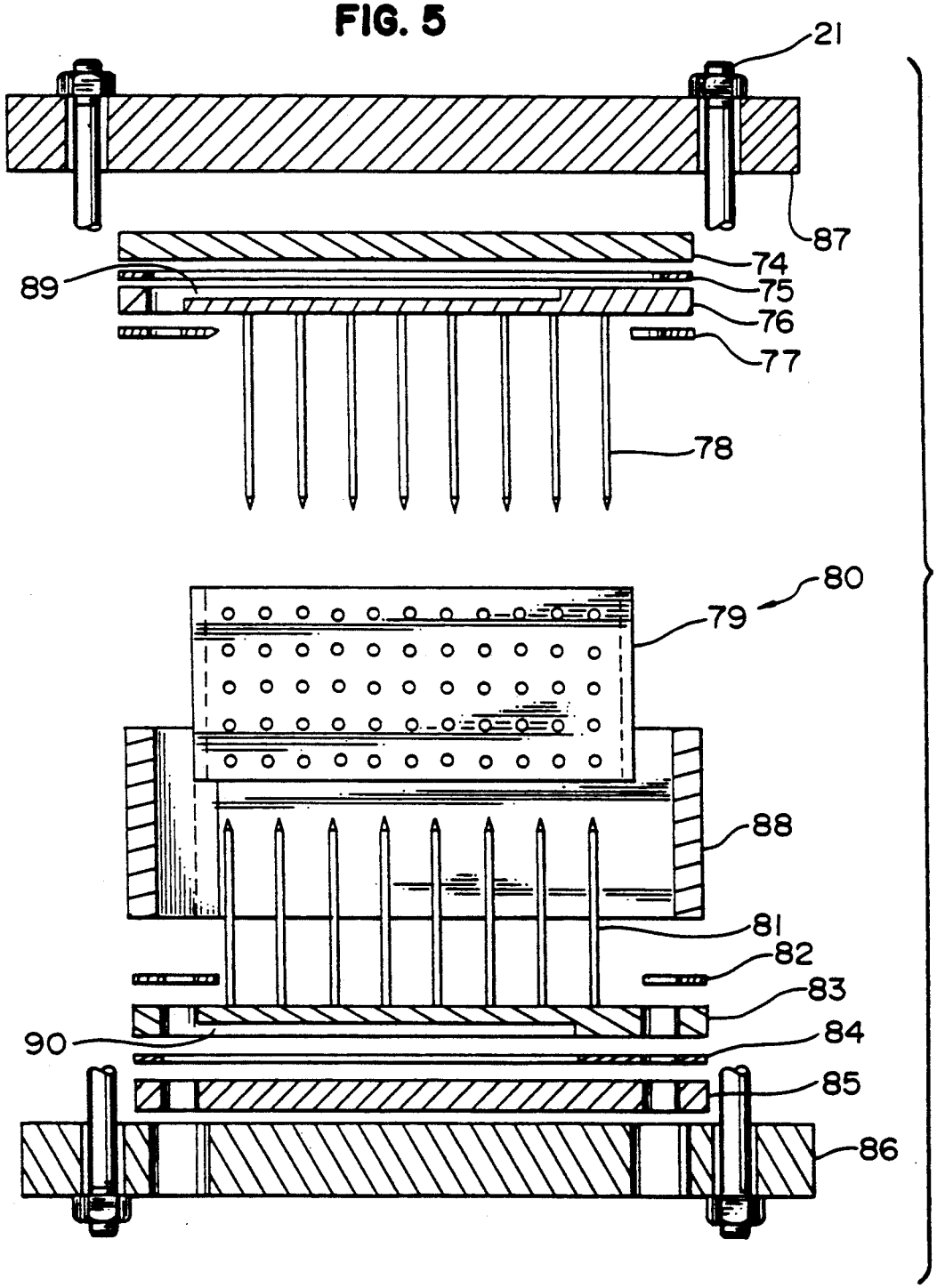
FIG. 5 is an exploded side view of the reaction section of a second embodiment of the modular isothermal reactor, showing thermally conductive pins used to distribute heat to the catalyst bed.
Figure 6:
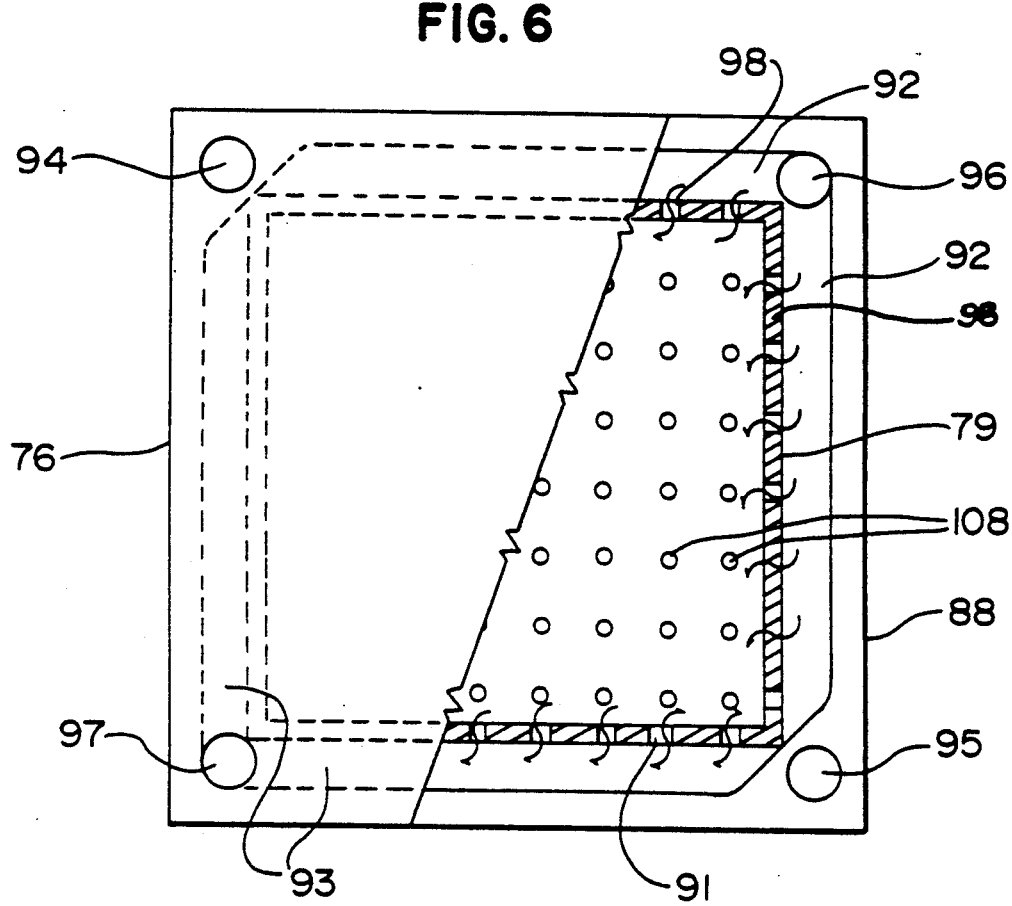
FIG. 6 is a top view of a portion of the reaction section of FIG. 5.

A second embodiment of the modular isothermal reactor is shown in FIGS. 5 and 6. With reference to FIG. 5, reactor assembly 80 comprises a blind end plate 87, an insulator plate 74, a first fluid flow plate 76, a housing 88, a second fluid flow plate 83, a ported insulator plate 85, and a ported end plate 86. The insulator plate 74 is adjacent the blind end plate 87. The first fluid flow plate 76 is adjacent the insulator plate 74 so that the adjacent surfaces of the first fluid flow plate 76 and the insulator plate 74 form a passage 89 through which a thermal fluid may be circulated. The second fluid flow plate 83 is adjacent the ported insulator plate 85 so that the adjacent surfaces of the second fluid flow plate 83 and the ported insulator plate 85 form a passage 90 through which a thermal fluid may be circulated.

Housing 88 is interposed between the first fluid flow plate 76 and the second fluid flow plate 83. Catalyst containment vessel 79 sits inside the housing 88. Thermally conductive pins 78 extend from the first fluid flow plate 76 into the catalyst bed. Thermally conductive pins 81 extend from the second fluid flow plate 83 into the catalyst bed. Thermally conductive pins 78 and thermally conductive pins 81 are offset to facilitate even heat distribution throughout the catalyst bed.

In this embodiment, heat from the thermal fluid is passed to the fluid flow plates and then to the thermally conductive pins. Heat from the pins is then transferred to the feedstock/water mixture to provide the endothermic heat of reaction for the reforming reaction.

Gaskets 75, 77, 82, and 84 are interposed at various locations throughout the reactor assembly 80 to provide seals where needed. Specifically, gasket 75 is interposed between insulator plate 74 and first fluid flow plate 76. Gasket 77 is interposed between first fluid flow plate 76 and cylindrical housing 88. Gasket 82 is interposed between cylindrical housing 88 and second fluid flow plate 83. Gasket 84 is interposed between second fluid flow plate 83 and ported insulator plate 85.

During operation, a feedstock/water mixture passes over catalyst packed within the catalyst containment vessel 79. Heat is supplied by a thermal fluid which circulates through the passages 89 and 90. Thermally conductive pins 78 and 81 conduct heat from the fluid flow plates 76 and 83 into the catalyst bed.

FIG. 6 provides a top view of a portion of the reactor assembly 80 of FIG. 5. In FIG. 6, the first fluid flow plate 76 is shown in a cutaway view to reveal the catalyst containment vessel 79 and the housing 88. Holes 108 in the bottom of the catalyst containment vessel 79 accommodate the thermally conductive pins 81 (shown in FIG. 5) extending from the second fluid flow plate 83 into the catalyst bed.

As shown in FIG. 6, holes 98 located on two sides of catalyst containment vessel 79 communicate with feedstock/steam distribution channels 92 to allow the feedstock and steam mixture to enter the catalyst containment vessel 79 where the reaction occurs. Holes 91 located on the remaining two sides of catalyst containment vessel 79 communicate with product collection channels 93 to allow the product to exit the catalyst containment vessel 79.

During operation, the feedstock/steam mixture passes through supply header 96 to distribution channels 92. From distribution channels 92 the feedstock/steam mixture passes through holes 98 into the catalyst containment vessel 79, where the reaction occurs. The reaction products then pass through holes 91 into the product collection channels 93 and then out of the reactor via product outlet header 97. Thermal fluid circulates on either side of the catalyst containment vessel 79 and collects in thermal fluid headers 94 and 95.

Figure 7:
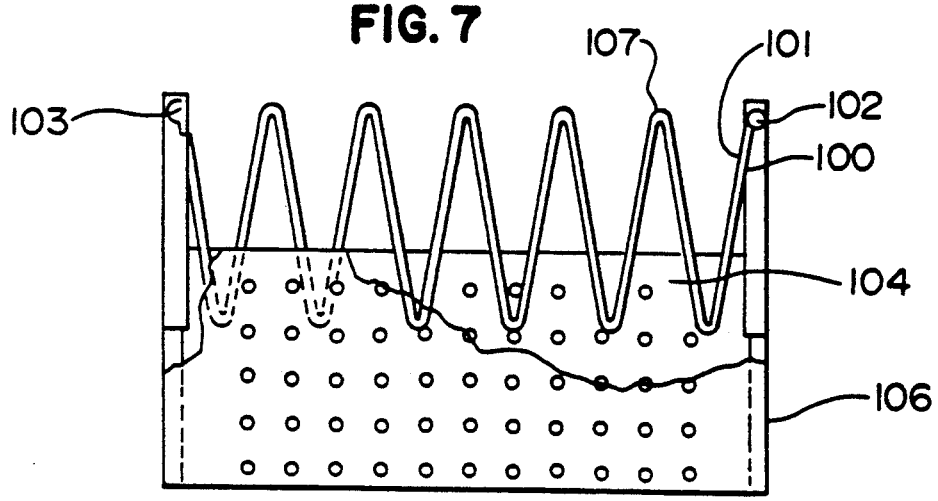
FIG. 7 is a side view of the catalyst bed chamber of a third embodiment of the modular isothermal reactor, showing the accordian-shaped thermal fluid distribution channel through which the thermal fluid flows within the catalyst bed.

The catalyst bed of a third embodiment of the modular isothermal reactor is shown in FIG. 7. In the embodiment, plates 100 and 101 are folded in such a manner as to form cavity 107. Plates 100 and 101 are terminated on either side of a row of perforations in distribution/collection headers 102 and 103. The perforations in headers 102 and 103 allow thermal fluid to pass into and out of plate cavity 107. The catalyst containment vessel 106 sits inside a housing (not shown in FIG. 7).

During operation, thermal fluid flows through the catalyst bed within cavity 107 formed between folded plates 100 and 101. Reactant gases flow on either side of folded plates 100 and 101. In one configuration, the reactant gases flow in substantially one direction across the catalyst bed through parallel paths defined by the "A" shaped chambers 104 formed by folded plates 100 and 101. In a second configuration, the reactant gases in adjacent "A" shaped chambers flow in substantially opposite directions, the "A" shaped chambers forming a single continuous path.

Of course, many modifications and other embodiments of the invention will be recognized by one skilled in the art in view of the foregoing teachings. Therefore, the invention is not to be limited to the exact construction and operation described, and any suitable modifications are intended to be included within the scope of the claims allowed herein. Accordingly, such allowed claims are to be accorded a range of equivalents fully commensurate in scope with the advance made over the prior art.

What is claimed is:

1. A modular isothermal rector for catalytically converting a feedstock into a fuel useable in a power generation system comprising:
   a. a sealing plate;
   b. a baffle plate having heat transfer structures extending substantially perpendicularly from one surface thereof;
   c. a housing interposed between said sealing plate and said baffle plate, said housing having an interior surface substantially circumscribing said heat transfer structures, whereby the cooperating surfaces of said sealing plate, said baffle plate, said heat transfer structures, and said housing define a labyrinthine channel for containing a suitable quantity of solid catalyst and accommodating the flow of feedstock and fuel therethrough;
   d. a fluid flow plate adjacent to said baffle plate, the cooperating surfaces of said fluid flow plate and said baffle plate defining a flow passage therebetween for carrying a thermal fluid, said flow passage fluidly separated from the labyrinthine channel carrying the feedstock.

2. The reactor of claim 1, wherein said labyrinthine channel has a feedstock inlet port and a fuel outlet port, said ports located near the interior surface of said housing, wherein said labyrinthine channel comprises a plurality of semicircular arcuate a channels arranged substantially symmetrically between said sealing plate and said baffle plate.

3. The reactor of claim 2 further comprising a second fluid flow plate adjacent said sealing plate, the cooperating surfaces of said second fluid flow plate and said sealing plate defining a flow passage therebetween for carrying a thermal fluid.

4. The reactor of claim 3 further comprising a pair of end plates and means for consolidating said end plates, fluid flow plates, baffle plate, sealing plate, and housing into a unitary assembly.

5. The reactor of claim 1 wherein said flow passage comprises a plurality of substantially parallel segments, such that a fluid passing through said passage flows alternately in one direction and then in a substantially opposite direction.

6. The reactor of claim 4 wherein said solid catalyst comprises copper-zinc oxide.

7. The reactor of claim 4 wherein said end plates and said housing are formed of stainless steel, and said sealing plate, said first and second fluid flow plates, said baffle plate, and said heat transfer surfaces are formed of copper or aluminum.

8. The reactor of claim 1 further comprising a heat exchange operatively connected between said end plate and said reactor section, said heat exchange section comprising:
   a. a sealing plate;
   b. a first fluid flow plate adjacent to said sealing plate, the cooperating surfaces of said first fluid flow plate and said sealing plate defining a fluid flow passage therebetween for carrying a thermal fluid, said flow passage fluidly separated from the labyrinthine channel carrying the feedstock;

c. a second fluid flow plate adjacent to said first fluid flow plate, the cooperating surfaces of said first and second fluid flow plates defining a fluid flow passage through which a feedstock is passed;

whereby heat is transferred between said thermal fluid and said feedstock.

9. A modular isothermal reactor for converting a feedstock into a fuel usable in a power generation system comprising:

a. a sealing plate;

b. a baffle plate having thermally conductive pins extending from one surface thereof in the direction of said sealing plate;

c. a catalyst containment vessel interposed between said sealing plate an said baffle plate, said vessel containing a suitable quantity of solid catalyst and accommodating the flow of feedstock and fuel therethrough;

d. a housing having an inferior surface substantially circumscribing said catalyst containment vessel;

e. a fluid flow plate adjacent to said baffle plate, the cooperating surfaces of said fluid flow plate and said baffle plate defining a flow passage therebetween for carrying a thermal fluid, said flow passage fluidly separated form the labyrinthine channel carrying the feedstock.

10. The reactor of claim 9 further comprising a second fluid flow plate adjacent said sealing plate, the cooperating surfaces of said second fluid flow plate and said sealing plate defining a flow passage therebetween for carrying a thermal fluid.

11. The reactor of claim 10 further comprising a pair of end plates and means for consolidating said end plates, fluid flow plates, baffle plate, sealing plate, and housing into a unitary assembly.

12. The reactor of claim 11 wherein said solid catalyst comprises copper-zinc oxide.

13. The reactor of claim 11 wherein said end plates and said housing are formed of stainless steel and said sealing plate, said first and second fluid flow plates, said baffle plate, and said heat transfer surfaces are formed of copper or aluminum.

14. The reactor of claim 9 further comprising heat exchange section, said heat exchange operatively connected between said end plate and said reactor section comprising:

a. a sealing plate;

b. a first fluid flow plate adjacent said sealing plate, the cooperating surfaces of said first fluid flow plate and said sealing plate defining a fluid flow passage therebetween through which a thermal fluid is passed;

c. a second fluid flow plate adjacent said first fluid flow plate, the cooperating surfaces of said first and second fluid flow plates defining a fluid flow passage through which a feedstock is passed;

whereby heat is transferred between said thermal fluid and said feedstock.

15. A modular isothermal reactor for converting a feedstock into a fuel usable in a power generation system comprising:

a. a first sealing plate;

b. a second sealing plate;

c. a catalyst containment vessel interposed between said first and second sealing plates, said vessel containing a suitable quantity of solid catalyst and accommodating the flow of feedstock and fuel therethrough;

d. a housing having an interior surface substantially circumscribing said catalyst containment vessel;

e. at least one pair of spaced folded plates extending into said catalyst containment vessel, said spaced folded plates defining a passage therebetween for carrying fluid.

16. The reactor of claim 15 wherein said spaced folded plates are folded in a substantially accordian shape, whereby said folded plates form substantially "A" shaped channels within said catalyst containment vessel through which a feedstock is passed.

17. The reactor of claim 15 further comprising a second fluid flow plate adjacent said first sealing plate, the cooperating surfaces of said second fluid flow plate and said first sealing plate defining a flow passage therebetween for carrying a thermal fluid.

18. The reactor of claim 15 further comprising a pair of end plates and means for consolidating said end plates, sealing plates, and housing into a unitary assembly.

19. The reactor of claim 18 wherein said solid catalyst comprises copper-zinc oxide.

20. The reactor of claim 18 wherein said end plates and said housing are formed of stainless steel, and said sealing plates and said folded plates are formed of copper or aluminum.

21. The reactor of claim 15 further comprising a heat exchange section, said heat exchange operatively connected between second plate and said reactor section comprising:

a. a sealing plate;

b. a first fluid flow plate adjacent said sealing plate, the cooperating surfaces of said first fluid flow plate and said sealing plate defining a fluid flow passage therebetween through which a thermal fluid is passed;

c. a second fluid flow plate adjacent said first fluid flow plate, the cooperating surfaces of said first and second fluid flow plates defining a fluid flow passage through which a feedstock is passed; whereby heat is transferred between said thermal fluid and said feedstock.

* * * * *